United States Patent
Natsume (10) Patent No.: US 8,384,329 B2
(45) Date of Patent: Feb. 26, 2013

(54) WIPER SYSTEM AND WIPER CONTROL METHOD

(75) Inventor: Takashi Natsume, Toyohashi (JP)

(73) Assignee: ASMO Co., Ltd., Shizuoka-pref (JP)

( * ) Notice: Subject to any disclaimer, the term of this patent is extended or adjusted under 35 U.S.C. 154(b) by 499 days.

(21) Appl. No.: 12/654,475

(22) Filed: Dec. 22, 2009

(65) Prior Publication Data

US 2010/0162511 A1     Jul. 1, 2010

(30) Foreign Application Priority Data

Dec. 26, 2008   (JP) ................................ 2008-334363

(51) Int. Cl.
*G05D 3/00* (2006.01)
(52) U.S. Cl. .................. 318/466; 318/280; 318/560
(58) Field of Classification Search .................. 318/444, 318/445, 466, 400.01, 280, 721, 799, 560, 318/599, 68, 484; 307/10.1; 15/250.13; 200/19.07
See application file for complete search history.

(56) References Cited

U.S. PATENT DOCUMENTS

| | | | |
|---|---|---|---|
| 6,384,557 B1 | 5/2002 | Weber et al. | |
| 6,609,266 B1 * | 8/2003 | Satoh et al. | ................ 15/250.13 |
| 6,703,804 B1 * | 3/2004 | Courdier et al. | ............. 318/445 |
| 6,917,173 B2 * | 7/2005 | Takagi | .......................... 318/444 |
| 2002/0030458 A1 | 3/2002 | Weber et al. | |

FOREIGN PATENT DOCUMENTS

JP    A-2002-114134    4/2002

* cited by examiner

*Primary Examiner* — Antony M Paul
(74) *Attorney, Agent, or Firm* — Posz Law Group, PLC (57) ABSTRACT

A wiper is continuously reciprocally swung between an upper return position and a lower return position by controlling an electric motor when an operational command for executing a continuous operational mode is entered by a user through a wiper switch. The wiper is reciprocally swung after stopping of the wiper for a predetermined time period at a predetermined position, which is located on an outer side of the lower return position that is opposite from the upper return position in a swing direction of the wiper and at which an influence of a wind pressure applied to the wiper is smaller in comparison to the lower return position, by controlling the electric motor when an operational command for executing an intermittent operational mode is entered through the entering means.

7 Claims, 6 Drawing Sheets

WIPER SYSTEM AND WIPER CONTROL METHOD

CROSS REFERENCE TO RELATED APPLICATION

This application is based on and incorporates herein by reference Japanese Patent Application No. 2008-334363 filed on Dec. 26, 2008.

BACKGROUND OF THE INVENTION

1. Field of the Invention

The present invention relates to a wiper system and a wiper control method.

2. Description of Related Art

Rain droplets, which adhere to a front glass of a vehicle (e.g., an automobile), may reduce a visibility of a front view of a driver through the front glass. In order to avoid the reduction in the visibility, a wiper system is provided. In such a wiper system, a wiper is reciprocally swung over the front glass in response to rotation of a wiper motor to wipe the rain droplets adhered to the front glass.

As the wiper system of the above-described type, Japanese Unexamined Patent Publication No. 2002-524335A (corresponding to U.S. Pat. No. 6,384,557B1) recites a wiper drive system, which reciprocally drives a wiper by, driving an electric motor in a forward rotational direction and a backward rotational direction.

In the wiper drive system, the wiper is driven in one of a continuous operational mode and an intermittent operational mode. In the continuous operational mode, the wiper is continuously reciprocally swung between an upper return position and a lower return position. In the intermittent operational mode, the wiper is intermittently reciprocally swung between the upper return position and the lower return position.

However, in the case of the wiper drive system recited in Japanese Unexamined Patent Publication No. 2002-524335A, when the speed of the vehicle is increased to cause an increase in the head wind applied to the vehicle, the wiper, which is stopped at the lower return position during the operation in the intermittent operational mode, may possibly be disadvantageously lifted by the head wind from the lower return position toward the upper return position.

SUMMARY OF THE INVENTION

The present invention addresses the above disadvantage. Therefore, it is an objective of the present invention to provide a wiper system and a wiper control method, which effectively limit movement of a wiper from a stop position caused by a wind pressure during an operation in an intermittent operational mode.

To achieve the objective of the present invention, there is provided a wiper system including a wiper, an electric motor, an entering means and a control means. The wiper is pivotably supported to swing over a wiping subject surface and thereby to wipe the wiping subject surface. The electric motor has an output shaft, which is connected to the wiper to transmit a rotational force of the electric motor to the wiper. The electric motor drives the wiper to execute a reciprocal swing operation of the wiper between an upper return position and a lower return position upon forward and backward rotations of the output shaft. The entering means is for entering one of a plurality of operational commands of the wiper to execute a corresponding one of a plurality of operational modes of the wiper. For instance, the entering means may be operated by a user to enter the corresponding operational command. The plurality of the operational modes includes a continuous operational mode to continuously reciprocally swing the wiper and an intermittent operational mode to intermittently reciprocally swing the wiper. The control means is for controlling the electric motor. The control means controls the electric motor to continuously reciprocally swing the wiper between the upper return position and the lower return position when the operational command for executing the continuous operational mode is entered through the entering means. The control means controls the electric motor such that the wiper is reciprocally swung after stopping of the wiper for a predetermined time period at a predetermined position, which is located on an outer side of the lower return position that is opposite from the upper return position in a swing direction of the wiper and at which an influence of a wind pressure applied to the wiper is smaller in comparison to the lower return position, when the operational command for executing the intermittent operational mode is entered through the entering means.

To achieve the objective of the present invention, there is also provided a wiper control method for controlling a wiper that is pivotably supported to swing over a wiping subject surface and thereby to wipe the wiping subject surface. According to the wiper control method, the wiper is continuously swung between an upper return position and a lower return position by controlling an electric motor that has an output shaft, which is connected to the wiper to transmit a rotational force of the electric motor to the wiper, when an operational command for executing a continuous operational mode is entered through an entering means. The wiper is reciprocally swung after stopping of the wiper for a predetermined time period at a predetermined position, which is located on an outer side of the lower return position that is opposite from the upper return position in a swing direction of the wiper and at which an influence of a wind pressure applied to the wiper is smaller in comparison to the lower return position, by controlling the electric motor when an operational command for executing an intermittent operational mode is entered through the entering means.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 1:
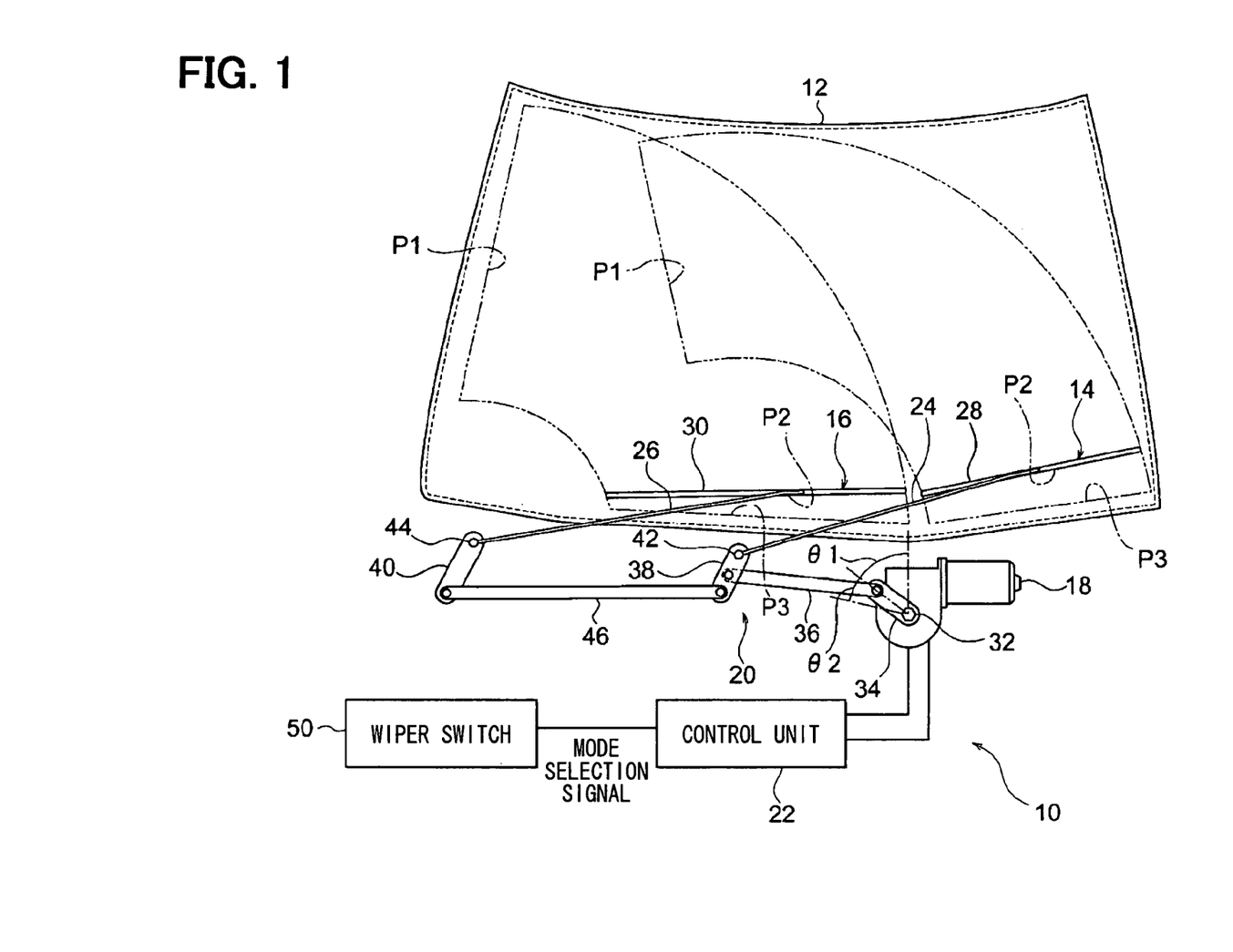
FIG. 1 is a schematic diagram showing an entire structure of a wiper system according to an embodiment of the present invention.
Figure 2:
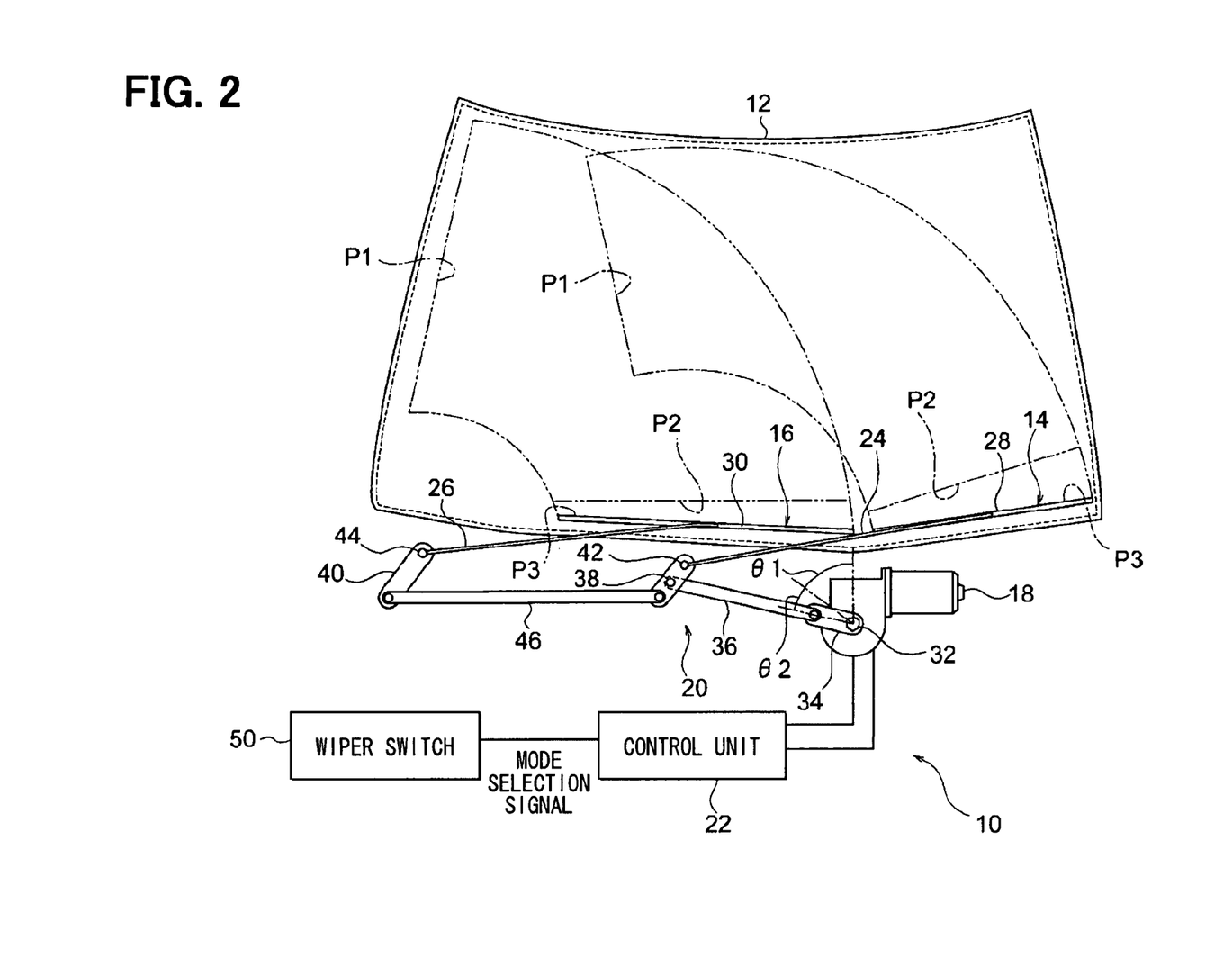
FIG. 2 is a schematic diagram showing the wiper system of FIG. 1, indicating wipers placed in a park position thereof.

FIGS. 1 and 2 show a wiper system 10 according to an embodiment of the present invention. The wiper system 10 wipes a front glass, i.e., a windshield (forming a wiping subject surface) 12 of a vehicle (e.g., an automobile) and includes two wipers 14, 16, a wiper motor (serving as an electric motor) 18, a link mechanism 20 and a control unit (serving as a control means) 22.

Each wiper 14, 16 includes a wiper arm 24, 26 and a wiper blade 28, 30. A base end portion of the wiper arm 24, 26 is fixed to a corresponding pivot shaft 42, 44, and the wiper blade 28, 30 is fixed to a distal end portion of the wiper arm 24, 26.

When the wiper arm 24, 26 is pivoted, i.e., is swung, the wiper 14, 16 is reciprocally swung over the front glass 12 to wipe the same.

The wiper motor 18 has an output shaft 32, which is rotatable in both a forward rotational direction and a backward rotational direction. The link mechanism 20 includes a crank arm 34, a first link rod 36, two pivot levers 38, 40, two pivot shafts 42, 44 and a second link rod 46.

One end portion of the crank arm 34 is fixed to the output shaft 32, and the other end portion of the crank arm 34 is rotatably connected to one end portion of the first link rod 36. The other end portion of the first link rod 36 is rotatably connected to one end portion of the pivot lever 38. Two opposed ends of the second link rod 46 are rotatably connected to the one end portions, respectively, of the pivot levers 38, 40.

Each pivot shaft 42, 44 is rotatably supported by a corresponding pivot holder (not shown), which is provided to a vehicle body. The other end portion of each pivot lever 38, 40 is fixed to the corresponding pivot shaft 42, 44.

In this wiper system 10, when the output shaft 32 is reciprocally rotated forward and backward within a first rotational angular range θ1, the rotational force of the output shaft 32 is transmitted to the wiper arms 24, 26 through the link mechanism 20 to reciprocally swing the wiper arms 24, 26. When each wiper arm 24, 26 is reciprocally swung, the corresponding wiper blade 28, 30 is reciprocally swung between an upper return position P1 and a lower return position P2 on the front glass 12.

Furthermore, in this wiper system 10, when the output shaft 32 is reciprocally rotated forward and backward in a second rotational angular range θ2, the wiper blade 28, 30 is displaced between the lower return position P2 and a park position P3 located below the second lower return position P2.

In the following description, when the wiper blade 28, 30 is placed in the upper return position P1, the lower return position P2 and the park position P3, it is assumed or said that the wiper 14, 16 itself is placed in the upper return position P1, the lower return position P2 and the park position P3, respectively, for the descriptive purpose.

In the wiper system 10, as shown in FIG. 2, when the wiper 14, 16 is placed in the park position P3, the crank arm 34 and the first link rod 36 are aligned to extend generally along an imaginary straight line.

The control unit 22 includes an input circuit, an electronic control unit (ECU) and a drive circuit and is connected to a wiper switch (serving as an entering means) 50 and the wiper motor 18.

In the wiper system 10 of the present embodiment, one of a continuous operational mode, an intermittent operational mode and a stop mode can be executed upon entering of a corresponding operational command (i.e., a continuous operational command, an intermittent operational command or a stop command) through the wiper switch 50 as an operational mode of the wiper system 10. In the continuous operational mode, the wiper 14, 16 is continuously reciprocally swung. In the intermittent operational mode, the wiper 14, 16 is intermittently swung at predetermined time intervals. In the stop mode, the wiper 14, 16 is stopped. The continuous operational mode of the wiper system 10 may include a high speed operational mode and a low speed operational mode. In the high speed operational mode, the wiper 14, 16 is continuously reciprocally swung at a high speed by driving the output shaft 32 of the wiper motor 18 at a high speed. In the low speed operational mode, the wiper 14, 16 is continuously reciprocally swung at a low speed by driving the output shaft 32 of the wiper motor 18 at a low speed. Furthermore, the operational modes of the wiper system 10 may further include any other operational mode(s), such as a mist mode. In the mist mode, the wiper 14, 16 is reciprocally swung only once.

The wiper switch 50 is operable by a driver (user) of a vehicle to place the wiper switch 50 into one of a continuous operational mode position, an intermittent operational mode position and a stop mode position to execute the corresponding one of the continuous operational mode, the intermittent operational mode and the stop mode. The wiper switch 50 outputs a corresponding mode selection signal (the corresponding operational command), which corresponds to the selected one of the continuous operational mode position, the intermittent operational mode position and the stop mode position, to the control unit 22.

In the wiper system 10, when the control unit 22 receives the mode selection signal, which is outputted from the wiper switch 50, the control unit 22 shifts to the corresponding operational mode, which corresponds to the mode selection signal received from the wiper switch 50.

Figure 3:
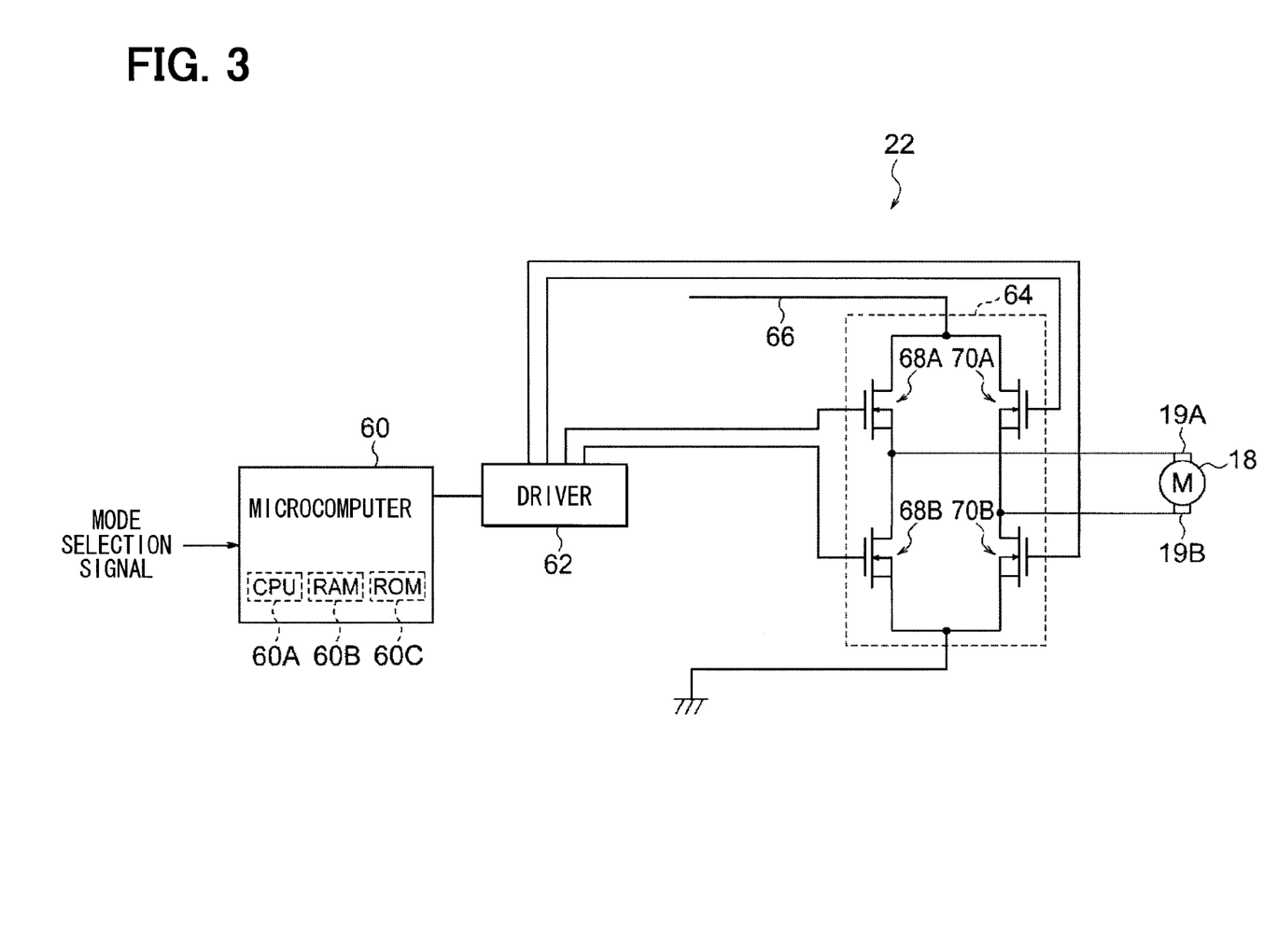
FIG. 3 is a block diagram showing a structure of a control unit of the wiper system according to the embodiment.

FIG. 3 shows the structure of the control unit 22 according to the present embodiment.

The control unit 22 includes a microcomputer 60, a driver 62 and an inverter-circuit 64.

The microcomputer 60 is connected with the wiper switch 50 and the driver 62. The microcomputer 60 receives the mode selection signal from wiper switch 50. The microcomputer 60 includes a central processing unit (CPU) 60A, a random access memory (RAM) 60B and a read only memory (ROM) 60C. At least one of the RAM 60B and the ROM 60C serves as a storage device (a computer readable storage medium, a storage means) of the present invention. The microcomputer 60 outputs a control signal, which controls the rotation of the wiper motor 18, to the driver 62.

The driver 62 is connected to the microcomputer 60 and the inverter circuit 64. When the driver 62 receives the control signal from the microcomputer 60, the driver 62 outputs four switching signals to the inverter circuit 64 based on the control signal.

An electric power of a predetermined voltage level is supplied to the inverter circuit 64 through a power supply line 66.

The inverter circuit 64 is formed as an H-bridge circuit and has four N-channel metal-oxide-semiconductor field-effect transistors (MOSFETs) as power control devices (elements) 68A, 68B, 70A, 70B, which control the power supply to the wiper motor 18. The four switching signals, which are outputted from the driver 62, are inputted to the gate terminals of the MOSFETs 68A, 68B, 70A, 70B.

When the low level switching signal is supplied to the gate terminal of the MOSFET 68A, 68B, 70A, 70B, the MOSFET 68A, 68B, 70A, 70B is placed in an OFF state. Therefore, the electric current does not flow from the drain terminal to the source terminal in the MOSFET 68A, 68B, 70A, 70B. However, when the high level switching signal is supplied to the gate terminal of the MOSFET 68A, 68B, 70A, 70B, the MOSFET 68A, 68B, 70A, 70B is placed in an ON state.

Therefore, the electric current flows from the drain terminal to the source terminal in the MOSFET 68A, 68B, 70A, 70B.

The wiper motor 18 of the present embodiment is formed as a direct current (DC) brush motor having two brushes 19A, 19B. The source terminal of the MOSFET 68A and the drain terminal of the MOSFET 68B are connected to the one brush 19A, and the source terminal of the MOSFET 70A and the drain terminal of the MOSFET 70B are connected to the other brush 19B.

When the MOSFET 68A and the MOSFET 70B are turned on, the electric current flows from the brush 19A to the brush 19B, so that the output shaft 32 is rotated in the one direction. In contrast, when the MOSFET 68B and the MOSFET 70A are turned on, the electric current flows from the brush 19B to the brush 19A, so that the output shaft 32 is rotated in the other direction.

The microcomputer 60 controls the rotation of the wiper motor 18 through the driver 62 to reciprocally swing the wipers 14, 16.

Furthermore, for example, rotation sensing switches (not shown) are provided to the wiper motor 18 to sense the rotational position of the wiper motor 18. The microcomputer 60 determines the location of the respective wipers 14, 16 based on the signals outputted from the rotation sensing switches. When the wiper 14, 16 approaches any one of the return positions, the microcomputer 60 reduces the rotational speed of the wiper motor 18 to reduce the moving speed of the wiper 14, 16. In contrast, when the wiper 14, 16 is moved at or around an intermediate position between the return positions, the microcomputer 60 increases the rotational speed of the wiper motor 18 to increase the moving speed of the wiper 14, 16.

Next, the operation of the wiper system 10 of the present embodiment will be described.

At the time of driving the wipers 14, 16, the user manipulates the wiper switch 50.

When the wiper switch 50 is manipulated by the user, the CPU 60A of the microcomputer 60 executes the control operation to drive the wipers 14, 16 at the selected operational mode, which is selected by the user through the wiper switch 50.

Figure 4:
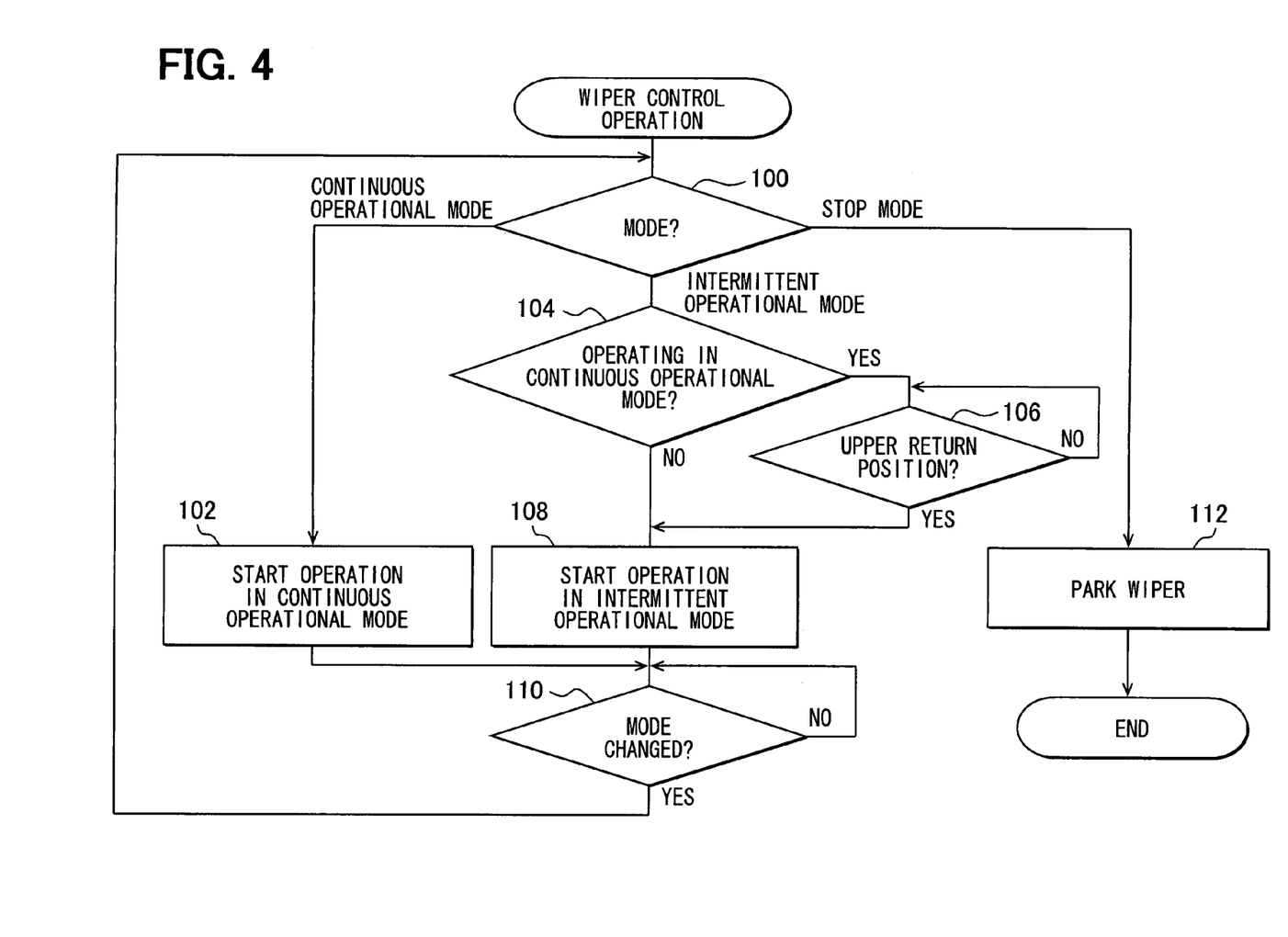
FIG. 4 is a flowchart showing a flow of a process of a wiper control operation according to the embodiment.

FIG. 4 shows a flowchart, which indicates a process of a wiper control operation (a wiper control program) that is executed by the CUP 60A when the operational mode is switched through the wiper switch 50. The wiper control program is pre-stored in a predetermined memory area of the ROM 60C.

At step 100, the operational mode, which is selected through the wiper switch 50, is determined based on the mode selection signal outputted from the wiper switch 50. When the operational mode is determined to be the continuous operational mode at step 100, the CPU 60A proceeds to step 102. In contrast, when the operational mode is determined to be the intermittent operational mode at step 100, the CPU 60A proceeds to step 104. Furthermore, when the operational mode is determined to be the stop mode at step 100, the CPU 60A proceeds to step 112.

Figure 5A:
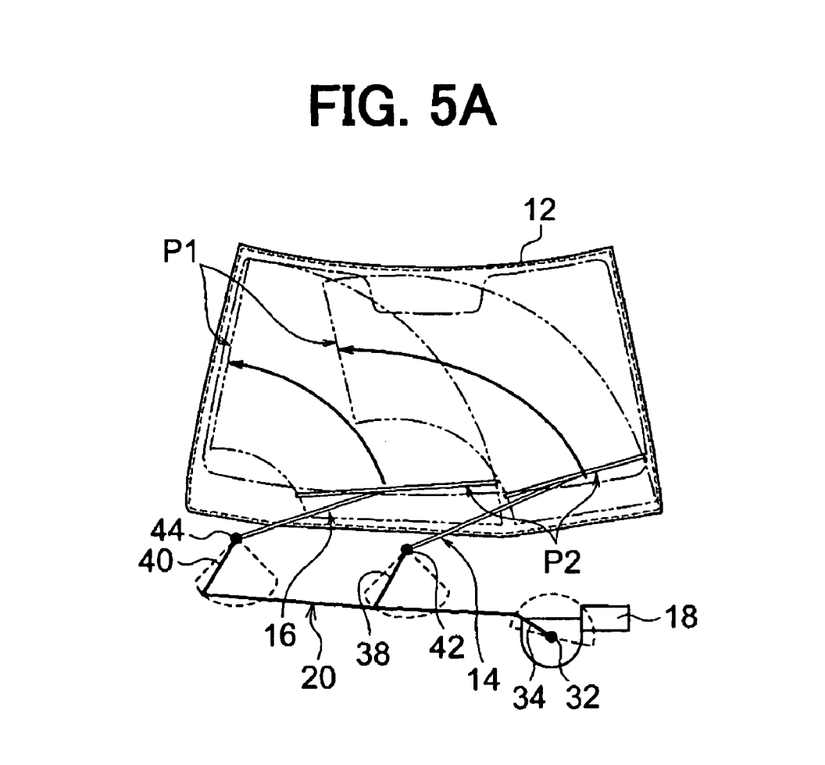
FIGS. 5A and 5B are schematic diagrams showing various operational positions of the wiper system of the embodiment operated in a continuous operational mode.
Figure 5B:
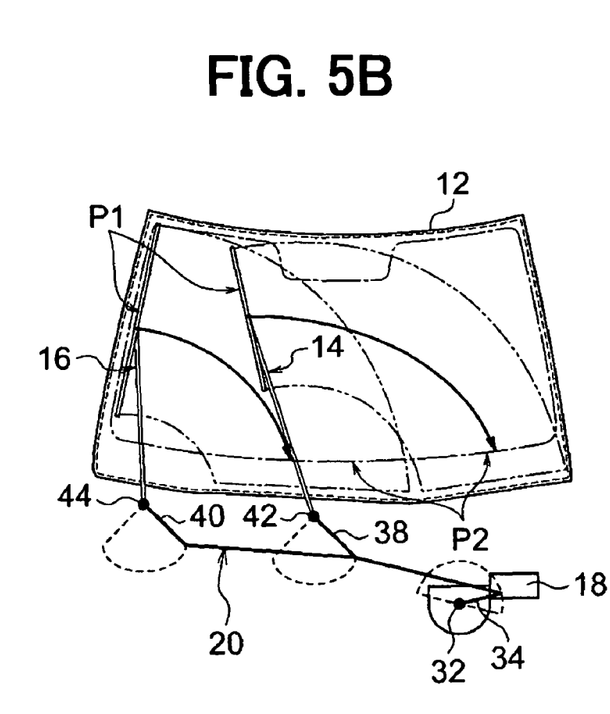

At step 102, the CPU 60A starts the operation in the continuous operational mode and proceeds to step 110. With reference to FIGS. 5A and 5B, when the operation in the continuous operational mode is started, the microcomputer 60 rotates the output shaft 32 of the wiper motor 18 in the one direction. Thereby, each wiper 14, 16 is moved toward the upper return position P1 thereof (see FIG. 5A). When the wiper 14, 16 reaches the upper return position P1 thereof, the microcomputer 60 reverses the rotational direction of the output shaft 32 of the wiper motor 18 to the other direction. Thereby, the wiper 14, 16 is moved toward the lower return position P2 thereof (see FIG. 5B). Then, when the wiper 14, 16 reaches the lower return position P2 thereof, the microcomputer 60 repeats the above process again, so that the microcomputer 60 rotates the output shaft 32 of the wiper motor 18 in the one direction once again. By repeating the above process, the wiper 14, 16 is continuously reciprocally swung between the upper return position P1 and the lower return position P2.

At step 104, the CPU 60A determines whether the wiper 14, 16 is currently operated in the continuous operational mode. When it is determined that the wiper 14, 16 is currently operated in the continuous operational mode at step 104 (i.e., YES at step 104), the CPU 60A proceeds to step 106. When it is determined that the wiper 14, 16 is not currently operated in the continuous operational mode at step 104 (i.e., NO at step 104), the CPU 60A proceeds to step 108.

At step 106, it is determined whether the currently operational position of the wiper 14, 16 is the upper return position P1. When it is determined that the current operational position of the wiper 14, 16 is the upper return position P1 at step 106 (i.e., YES at step 106), the operation proceeds to step 108. In contrast, when it is determined that the current operational position of the wiper 14, 16 is not the upper return position P1 at step 106 (i.e., NO at step 106), the CPU 60A repeats step 106 until the wiper 14, 16 reaches the upper return position P1.

Figure 6A:
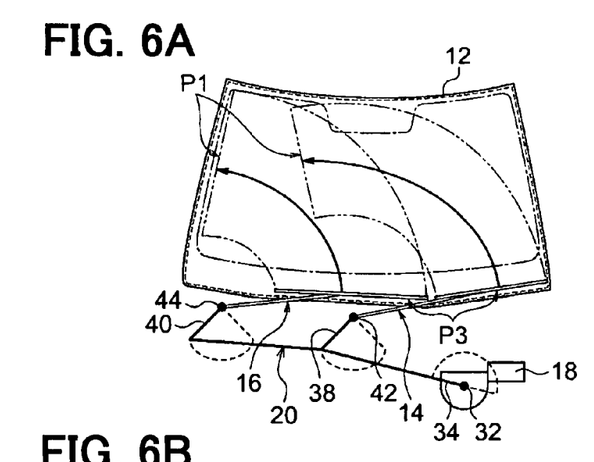
FIGS. 6A-6C are schematic diagrams showing various operational positions of the wiper system of the embodiment operated in an intermittent operational mode.
Figure 6B:
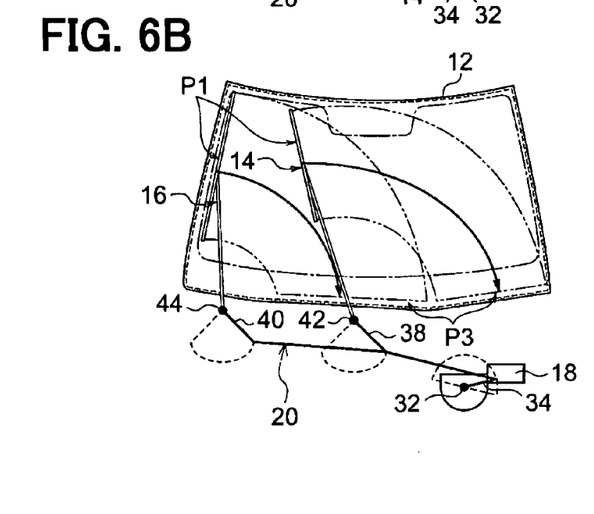
Figure 6C:
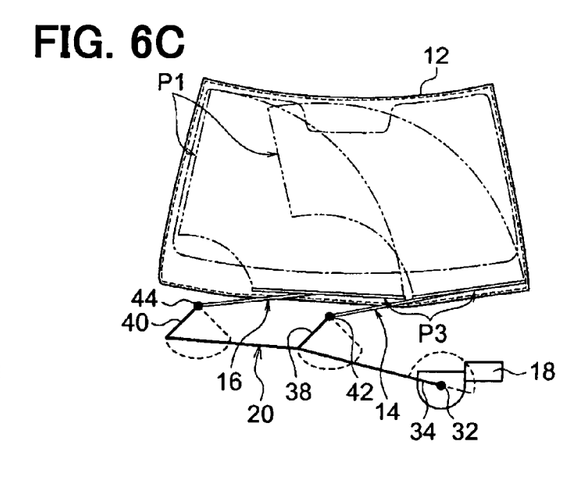

At step 108, the CPU 60A starts the operation in the intermittent operational mode and proceeds to step 110. With reference to FIGS. 6A to 6C, when the operation in the intermittent operational mode is started, the microcomputer 60 rotates the output shaft 32 of the wiper motor 18 in the one direction. Thereby, each wiper 14, 16 is moved toward the upper return position P1 thereof (see FIG. 6A). When the wiper 14, 16 reaches the upper return position P1 thereof, the microcomputer 60 reverses the rotational direction of the output shaft 32 of the wiper motor 18 to the other direction. Thereby, the wiper 14, 16 is moved toward the park position P3 thereof (see FIG. 6B). Then, when the wiper 14, 16 reaches the park position P3 thereof, the microcomputer 60 stops the wiper 14, 16 at the park position P3 for a predetermined time period (see FIG. 6C). Thereafter, the microcomputer 60 rotates the output shaft 32 of the wiper motor 18 in the one direction once again. By repeating the above process, the wiper 14, 16 is intermittently reciprocally swung between the upper return position P1 and the park position P3. If it is desirable, the predetermined time period for stopping the wiper 14, 16 at the park position P3 may be changed through, for example, a volume switch, which is provided, to the wiper switch 50 to change this time period among multiple steps (among multiple time periods).

At step 110, it is determined whether the changing of the operational mode at the wiper switch 50 is executed. When it is determined that the changing of the operational mode at the wiper switch 50 is executed at step 110 (i.e., YES at step 110), the CPU 60A returns to step 100. In contrast, when it is determined that the changing of the operational mode at the wiper switch 50 is not executed at step 110 (i.e., NO at step 110), the CPU 60A repeats step 110, so that the reciprocal swing movement of the wiper 14, 16 in the current operational mode is maintained.

At step 112, in the case where the wiper 14, 16 is currently moving toward the upper return position P1 (in the case where the output shaft 32 of the wiper motor 18 is currently rotated in the one direction) as well as in the case where the wiper 14, 16 is stopped at the lower return position P2, the microcomputer 60 drives the output shaft 32 of the wiper motor 18 to move the wiper 14, 16 toward the upper return position P1. When the wiper 14, 16 reaches the upper return position P1, the microcomputer 60 reverses the rotational direction of the output shaft 32 of the wiper motor 18 to the other direction. Thereby, the wiper 14, 16 is moved toward the park position P3 thereof. When the wiper 14, 16 reaches the park position P3 thereof, the microcomputer 60 stops the wiper 14, 16 at the park position P3. In contrast, in the case where the wiper 14, 16 is currently moving toward the lower return position P2 or the park position P3 (in the case where the output shaft 32 of the wiper motor 18 is currently rotated in the other direction), the microcomputer 60 drives the output shaft 32 of the wiper motor 18 to move the wiper 14, 16 toward the park position P3. When the wiper 14, 16 reaches the park position P3, the microcomputer 60 stops the rotation of the wiper motor 18.

As discussed above, according to the present embodiment, when the continuous operational mode is selected, i.e., is commanded through the wiper switch 50, the wiper 14, 16 is continuously reciprocally swung between the upper return position P1 and the lower return position P2. When the intermittent operational mode is selected, i.e., is commanded through the wiper switch 50, the wiper 14, 16 is stopped for the predetermined time period at the park position P3, which is located on the outer side of the lower return position P2 that is opposite from the upper return position P1 in the swing direction of the wiper 14, 16 and at which the influence of the wind pressure of the head wind applied to the wiper 14, 16 of the traveling vehicle is smaller in comparison to the lower return position P2. Thereafter, the wiper 14, 16 is reciprocally swung once again. Therefore, it is possible to limit the unintentional movement of the wiper 14, 16 caused by the wind pressure during the operation in the intermittent operational mode.

According to the present embodiment, the moving speed of the wiper 14, 16 is increased at or around the intermediate position and is then decreased upon approaching to any one of the return positions. However, the reciprocal swing range (reciprocal moving range) of the wiper 14, 16 is changed between the continuous operational mode and the intermittent operational mode. Therefore, for example, when the operation is changed from the continuous operational mode to the intermittent operational mode around the lower return position P2, the moving speed of the wiper 14, 16 is rapidly changed, thereby resulting in a non-smooth movement of the wiper 14, 16. In view of the above disadvantage, when the command for changing the operational mode from the continuous operational mode to the intermittent operational mode is received through the wiper switch 50 in the middle of the operation in the continuous operational mode, the microcomputer 60 may start the intermittent operational mode at the time of reaching of the wiper 14, 16 to the upper return position P1. In this way, wiper 14, 16 can maintain its smooth movement at the time of changing the operational mode.

The above embodiment is discussed with reference to the case where the park position P3 serves as the predetermined position at which the wiper 14, 16 is stopped during the operation in the intermittent operational mode. However, the present invention is not limited to this. For example, this stop position may be changed to another position, which is located between the lower return position P2 and the park position P3 as long as the influence of the wind pressure is smaller in comparison to the lower return position P2.

Furthermore, in the above embodiment, one of the three operational modes, i.e., the continuous operational mode, the intermittent operational mode and the stop mode is selectable. However, the selectable operational modes are not limited to these three operational modes and may include any other appropriate operational mode(s).

The structure (see FIGS. 1 and 2) of the wiper system 10 and the structure (see FIG. 3) of the control unit 22 discussed in the above embodiment are mere illustrative and may be modified in any appropriate manner within a spirit and scope of the present invention.

Furthermore, the flow of the wiper control program (see FIG. 4) is also mere illustrative and may be modified in any appropriate manner within a sprit and a scope of the present invention.

What is claimed is:

1. A wiper system comprising:
a wiper that is pivotably supported to swing over a wiping subject surface and thereby to wipe the wiping subject surface;
an electric motor that has an output shaft, which is connected to the wiper to transmit a rotational force of the electric motor to the wiper, wherein the electric motor drives the wiper to execute a reciprocal swing operation of the wiper between an upper return position and a lower return position upon forward and backward rotations of the output shaft;
an entering means for entering one of a plurality of operational commands of the wiper to execute a corresponding one of a plurality of operational modes of the wiper, wherein the plurality of the operational modes includes a continuous operational mode to continuously reciprocally swing the wiper and an intermittent operational mode to intermittently reciprocally swing the wiper; and
a control means for controlling the electric motor, wherein:
the control means controls the electric motor to continuously reciprocally swing the wiper between the upper return position and the lower return position as long as the operational command for executing the continuous operational mode is outputted from the entering means to the control means; and
the control means controls the electric motor such that the wiper is reciprocally swung between the upper return position and a predetermined position while stopping the wiper for a predetermined time period at the predetermined position upon arrival of the wiper at the predetermined position as long as the operational command for executing the intermittent operational mode is outputted from the entering means to the control means, and the predetermined position is located on an outer side of the lower return position that is opposite from the upper return position in a swing direction of the wiper and at which an influence of a wind pressure applied to the wiper is smaller in comparison to the lower return position.

2. The wiper system according to claim 1, wherein the predetermined position is a park position, at which the wiper is parked upon stopping of the reciprocal swing operation of the wiper.

3. The wiper system according to claim 1, wherein when the operational mode is changed from the continuous operational mode to the intermittent operational mode through the entering means, the control means controls the electric motor to start the reciprocal swing operation of the wiper in the intermittent operational mode at the time of reaching of the wiper to the upper return position.

4. The wiper system according to claim 1, wherein the wiping subject surface is a surface of a front glass of a vehicle.

5. A wiper control method for controlling a wiper that is pivotably supported to swing over a wiping subject surface and thereby to wipe the wiping subject surface, the wiper control method comprising:

continuously reciprocally swinging the wiper between an upper return position and a lower return position by controlling an electric motor that has an output shaft, which is connected to the wiper to transmit a rotational force of the electric motor to the wiper, as long as an operational command for executing a continuous operational mode is outputted from an entering means and reciprocally swinging the wiper between the upper return position and a predetermined position while stopping the wiper for a predetermined time period at the predetermined position upon arrival of the wiper at the predetermined position by controlling the electric motor as long as the operational command for executing the intermittent operational mode is outputted from the entering means.

6. A wiper control method according to claim 5, wherein the predetermined position is located on an outer side of the lower return position that is opposite from the upper return position in a swing direction of the wiper, where influence of a wind pressure applied to the wiper is smaller in comparison to the lower return position.

7. A wiper system comprising:

a wiper that is pivotably supported to swing over a wiping subject surface and thereby to wipe the wiping subject surface;

an electric motor that has an output shaft, which is connected to the wiper to transmit a rotational force of the electric motor to the wiper, wherein the electric motor drives the wiper to execute a reciprocal swing operation of the wiper between an upper return position and a lower return position upon forward and backward rotations of the output shaft;

an entering device that is operable by a user to enter one of a plurality of operational commands of the wiper to execute a corresponding one of a plurality of operational modes of the wiper, wherein the plurality of the operational modes includes a continuous operational mode to continuously reciprocally swing the wiper and an intermittent operational mode to intermittently reciprocally swing the wiper; and a controller that controls the electric motor, wherein:

the controller controls the electric motor to continuously reciprocally swing the wiper between the upper return position and the lower return position as long as the operational command for executing the continuous operational mode is outputted from the entering device to the controller; and the controller controls the electric motor such that the wiper is reciprocally swung between the upper return position and a predetermined position while stopping the wiper for a predetermined time period at the predetermined position upon arrival of the wiper at the predetermined position as long as the operational command for executing the intermittent operational mode is outputted from the entering device to the controller, and the predetermined position is located on an outer side of the lower return position that is opposite from the upper return position in a swing direction of the wiper and at which an influence of a wind pressure applied to the wiper is smaller in comparison to the lower return position.

* * * * *